United States Patent
Iwabuchi et al.

(10) Patent No.: US 6,787,253 B2
(45) Date of Patent: *Sep. 7, 2004

(54) TRANSPARENT ELECTROCONDUCTIVE FILM AND TOUCH PANEL

(75) Inventors: Yoshinori Iwabuchi, Tokyo (JP); Mitsuhiro Nishida, Tokyo (JP); Yukihiro Kusano, Cambridge (GB)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/156,787

(22) Filed: May 30, 2002

(65) Prior Publication Data

US 2003/0012955 A1 Jan. 16, 2003

(30) Foreign Application Priority Data

Jun. 27, 2001 (JP) ......................................... 2001-194995

(51) Int. Cl.$^7$ ............................ B32B 9/00; B32B 21/08
(52) U.S. Cl. ...................... 428/698; 428/698; 428/336; 428/408; 428/480; 428/697; 428/699; 428/702; 345/173
(58) Field of Search ............................... 428/336, 689, 428/697, 698, 699, 701, 702, 480, 408; 345/173

(56) References Cited

U.S. PATENT DOCUMENTS

| | | | |
|---|---|---|---|
| 4,585,689 A | | 4/1986 | Ohta et al. ................... 428/216 |
| 5,493,102 A | * | 2/1996 | Takase et al. ................ 219/547 |
| 5,808,715 A | | 9/1998 | Tsai et al. ................... 349/122 |
| 6,351,068 B2 | * | 2/2002 | Yamazaki et al. ........... 313/506 |

FOREIGN PATENT DOCUMENTS

| | | | |
|---|---|---|---|
| EP | 0 697 646 | 2/1996 | |
| JP | 2-194943 | 8/1990 | |
| JP | 2000351170 A | * 12/2000 | ............. B32B/7/02 |

OTHER PUBLICATIONS

Patent Abstract of Japan, vol. 2000, No. 15, Apr. 6, 2001 & JP2000–351170 A (Gunze Ltd), Dec. 19, 2000.

* cited by examiner

Primary Examiner—Stephen Stein (57) ABSTRACT

A provided transparent electroconductive film has a polymer film and a transparent electroconductive layer deposited on the polymer film, which has no problem of damages and removal of the transparent electroconductive layer. The transparent electroconductive film has a polymer film 4 and a transparent electroconductive layer 5 deposited on the polymer film 4. A protective layer 9 made of material different from that of the transparent electroconductive layer 5 is formed on the transparent electroconductive layer 5. A touch panel has the transparent electroconductive film as an upper electrode 6A or a lower electrode.

12 Claims, 4 Drawing Sheets

TRANSPARENT ELECTROCONDUCTIVE FILM AND TOUCH PANEL

FIELD OF THE INVENTION

The present invention relates to a transparent electroconductive film having a polymer film and a transparent electroconductive layer deposited on the polymer film, wherein the electroconductive layer is resistant fully to delamination or removal and the electroconductive film has good electrical characteristics and good durability. The present invention also relates to a touch panel provided with the transparent electroconductive film.

BACKGROUND OF THE INVENTION

A resistive touch panel is widely used as an input unit for a household appliance or a portable terminal because the touch panel is easy to be miniaturized, lightened, and thinned. When a user pushes a part of the touch panel or draws with a specialized pen on a part of the touch panel, the part comes into contact with an opposing electrode, so that the portion and the electrode are electrically connected and a signal is inputted.

Figure 4:
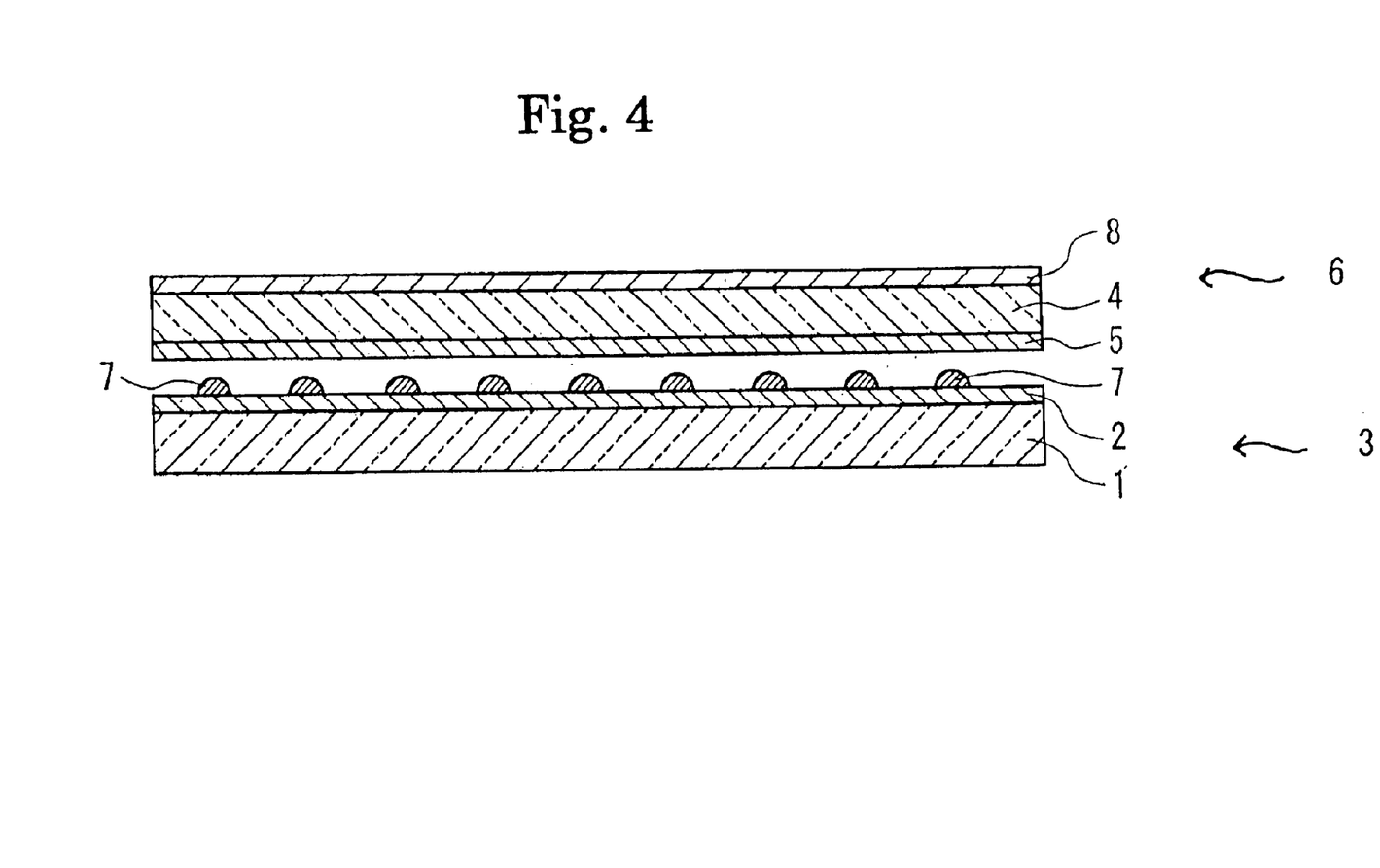
FIG. 4 shows a cross section of a conventional touch panel.

As shown in FIG. 4, a typical resistive touch panel has a lower electrode 3 having a glass plate 1 and a transparent electroconductive layer 2 deposited thereon; an upper electrode 6 having a polymer film 4 and a transparent electroconductive layer 5 deposited thereon; and spacers (microdot spacers) 7 interposed between the transparent electroconductive layers 2 and 5. Pressing the display surface of the upper electrode 6 with a finger or a pen makes the upper electrode 6 and the lower electrode 3 into contact with each other, so that these electrodes are electrically connected and a signal is inputted. The surface of the upper electrode 6 is overlaid with a hard-coating layer 8 for protecting the polymer film 4. Since the surface of the upper electrode 6 is rubbed with a finger or pen, the upper electrode requires resistance to wear, and therefore is provided with the hard-coating layer 8.

Japanese Patent H2-194943A discloses that after ITO (indium tin oxide) transparent electroconductive layer is deposited, heat treatment is conducted so as to crystallize ITO, for improving durability of the transparent electroconductive film for touch panel. However, since the substrate of the transparent electroconductive film is a polymer film, the temperature for the heat treatment is limited. The heat treatment thus needs to be conducted at relatively low temperature and for a long time, such as at 150° C. and for 24 hours. This causes problems of low productivity and high production cost.

In such a touch panel, with the input with a finger or pen, the transparent electroconductive layer 5 of the upper electrode 6 and the transparent electroconductive layer 2 of the lower electrode 3 are contacted and uncontacted repeatedly. The transparent electroconductive material such as ITO, which is a material for depositing transparent electroconductive layers 2, 5, has low resistance to wear and indentation. Therefore, in the transparent electroconductive layer 2 or 5, the transparent electroconductive layer 5 of the upper electrode 6, which deforms repeatedly during the input to the touch panel, is particularly easy to be cracked. In addition, the transparent electroconductive layer 5 is easy to be delaminated and removed from the polymer film 4 due to the repeated contact and uncontact of the transparent electroconductive layers 2 and 5, which are made of the same material.

When the transparent electroconductive layer 5 of the upper electrode 6 is damaged or delaminated, electrical resistivity of the surface of the transparent electroconductive layer 5 changes, and uniformity of the electrical resistivity is lost, thereby spoiling electrical properties, and thus the precise input can not be carried out. These cause a decrease in reliability of the touch panel, damages, defects, and a decrease in durability.

SUMMARY OF THE INVENTION

It is an object of the present invention to solve the aforementioned conventional problems, to provide a transparent conductive film comprising a polymer film and a transparent conductive layer deposited on the polymer film, which can realize a touch panel having no problem of damage and delamination of the transparent conductive layer, and having good reliability and durability, and to provide a touch panel provided with the transparent conductive film.

A transparent conductive film of the present invention has a polymer film, a transparent conductive layer deposited on the polymer film, and moreover, a protective layer, preferably made of material different from the transparent conductive layer, formed on the transparent conductive layer.

The surface of the transparent electroconductive layer is covered with the protective layer, so that physical or chemical stresses generated during the input to the touch panel do not affect transparent electroconductive layer directly, thus preventing damages and delamination of the transparent electroconductive layer.

Furthermore, the protective layer formed on the transparent electroconductive layer improves the strength of the transparent electroconductive film, thereby enhancing a resistance to wear.

In the present invention, though the protective layer is provided for improving durability of the transparent electroconductive layer, the improvement in a total luminous transmittance of the transparent electroconductive film and the control of its color shade also can be carried out by designing the refractive index, the thickness and the structure of lamination of the protective layer suitably. As a result, properties and functional characteristics of the transparent electroconductive film can be more improved.

The material constituting the protective layer applied in the present invention is not particularly limited and can be chosen from those that can provide an improved strength and an enhanced resistance to wear to the transparent electroconductive film. The material may be the same as or different from that of the transparent electroconducitve film. The protective layer of the present invention comprises preferably at least one selected from the group consisting of oxides, nitrides, carbides, carbon, and composites of these compounds (for example, oxidized nitride) as the main component, more preferably, at least one selected from the group consisting of C, $CN_x$, $BN_x$, $B_xC$ and $SiC_x$ as the main component. Or the protective layer may be a transparent thin film comprising oxide, nitride or oxidized nitride of at least one material selected from the group consisting of Si, Ti, Sn, Nb, In, Mg, Ta and Zn, more concretely, at least one selected from the group consisting of $SiO_x$, $TiO_x$, $SnO_x$, $NbO_x$, $InO_x$, $MgF_x$, $TaO_x$ and $ZnO_x$.

The thickness of the protective layer is preferably from 0.5 nm to 100 nm.

The protective layer is preferably a thin film formed by a physical depositing method such as vacuum evaporation method, sputtering method, ion plating method, and laser ablation method, or by a chemical depositing method such as CVD method, particularly a thin film made of $SiC_x$, $SiC_xO_y$, $SiC_xN_z$, or $SiC_xO_yN_z$ formed by sputtering method by using a SiC target. In this case, the SiC target preferably has a density of 2.9 g/cm³ or more. Particularly, it is desirable that the SiC target obtained by sintering a mixture of silicon carbide powder and nonmetal-based sintering assistant is used.

The protective layer of the present invention may be formed by coating the transparent electroconductive layer with a material therefor as it is or with a liquid substance including the material therefor and a solvent such as alcohol, ketone, toluene, hexane, etc.

The transparent electroconductive film of the present invention preferably has a surface resistivity of 300 to 2000 Ω/Sq. at a side where the protective layer is formed and a linearity value of not greater than 1.5%.

The linearity value is an index for indicating uniformity of the resistivity of a transparent electroconductive film. The linearity value can be expressed as follows.

Electrodes made of Ag paste or the like are provided at two sides of the transparent electroconductive film which are opposite to each other, and a direct voltage is applied to the two electrodes. It is defined that L is a distance between the two electrodes and V is an applied voltage. Then, at arbitrary points on the transparent electroconductive film, distances 1 from the points to the negative electrode and potential differences v from the points to the negative electrode are measured, respectively.

The linearity value is expressed as the following formula.

$$\text{Linearity } (\%) = |1/L - v/V| \times 100$$

The smaller the linearity value, the better the uniformity of the resistivity. When the linearity value is 0%, the resistivity is perfectly uniform. In case of a resistive touch panel, a linearity value is preferably not greater than 1.5%.

The transparent electroconductive layer of the present invention is preferable to be made of a transparent conductive oxide (TCO) of indium oxide system (including a system doped with indium oxide), a TCO of indium oxide and tin oxide (ITO), or a TCO of indium oxide and zinc oxide (IZO).

The touch panel of the present invention is provided with such a transparent electroconductive film of the present invention.

DETAILED DESCRIPTION OF THE PREFERRED EMBODIMENTS

Hereinafter, the preferred embodiments of the present invention will be described in detail with reference to the drawings.

Figure 1:
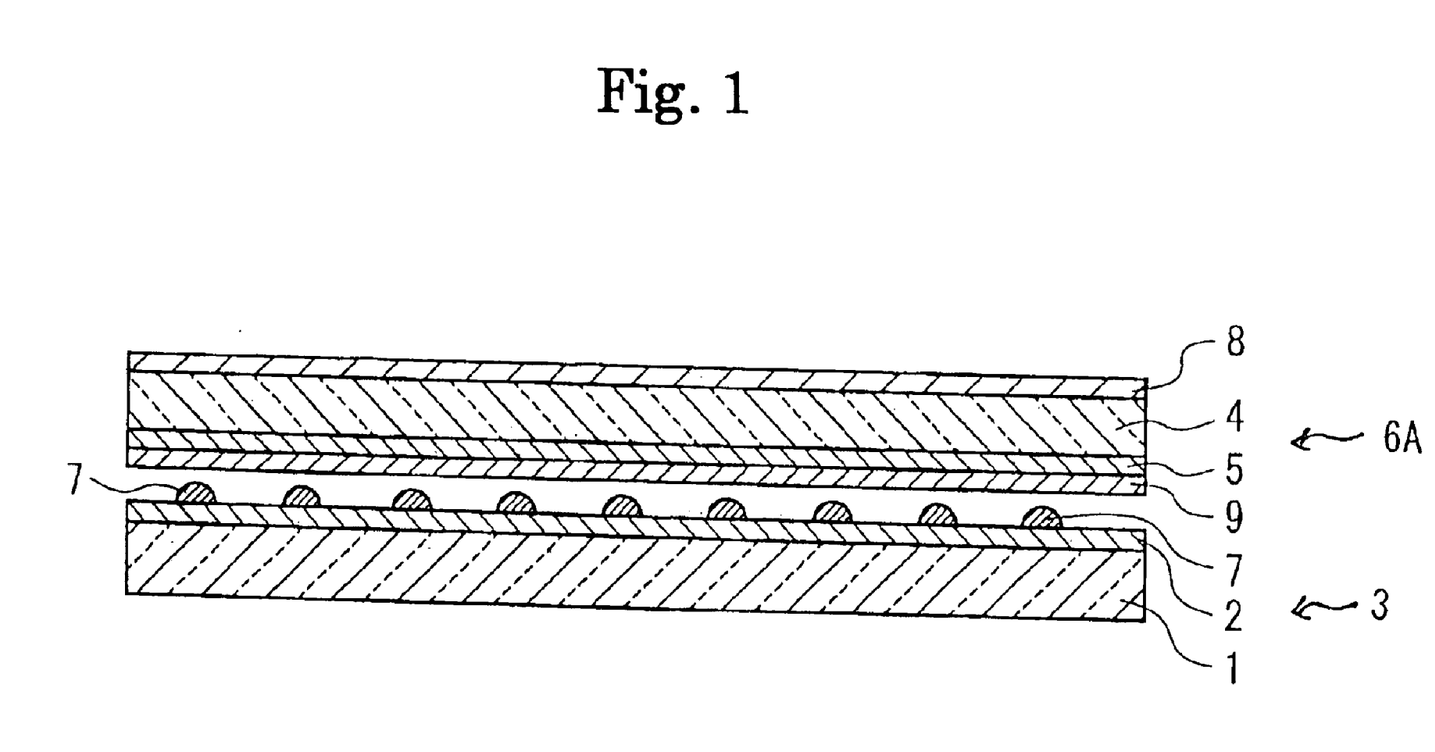
FIG. 1 shows a cross section of a touch panel of an embodiment provided with a transparent electroconductive film of the present invention.
Figure 2:
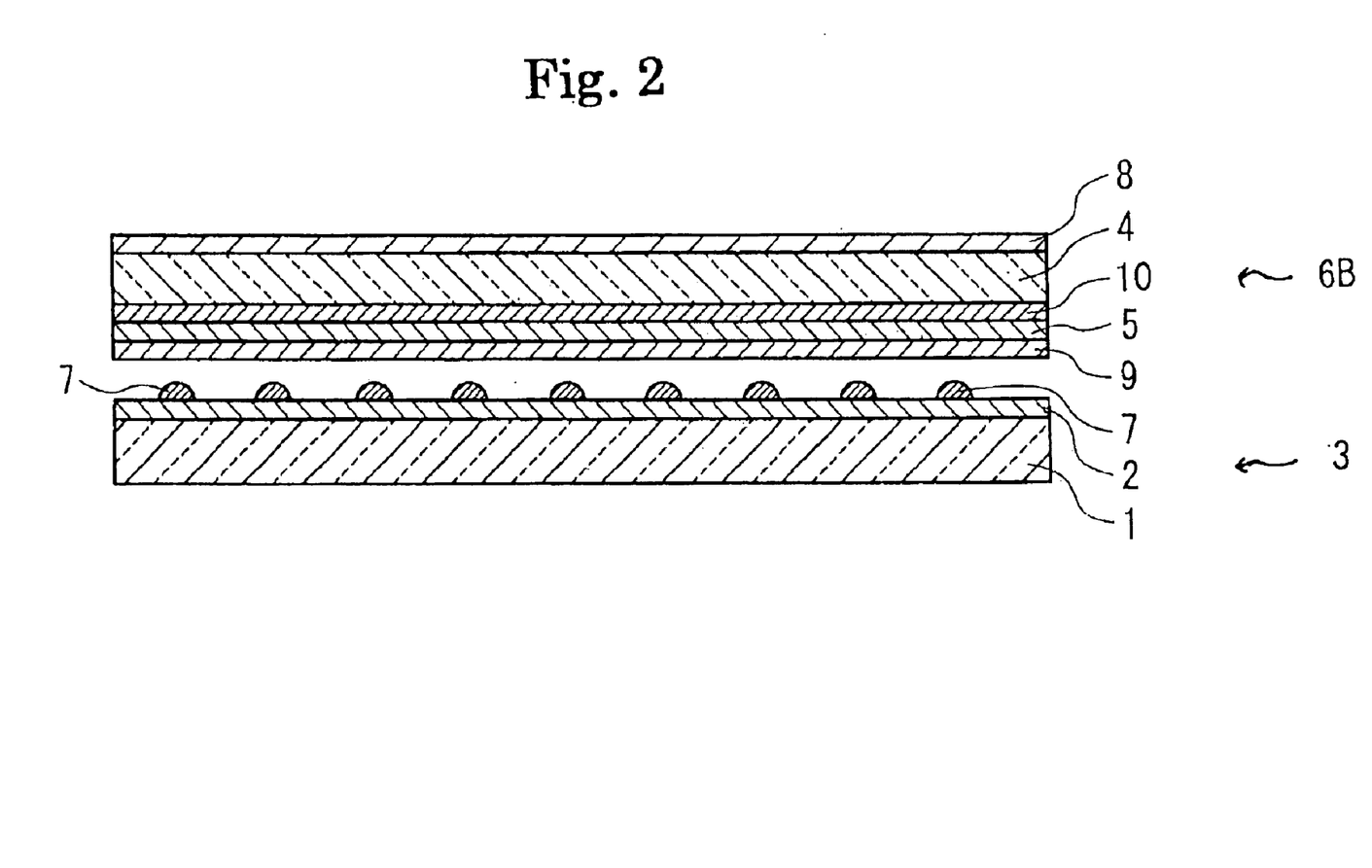
FIG. 2 shows a cross section of a touch panel of another embodiment provided with a transparent electroconductive film of the present invention.
Figure 3:
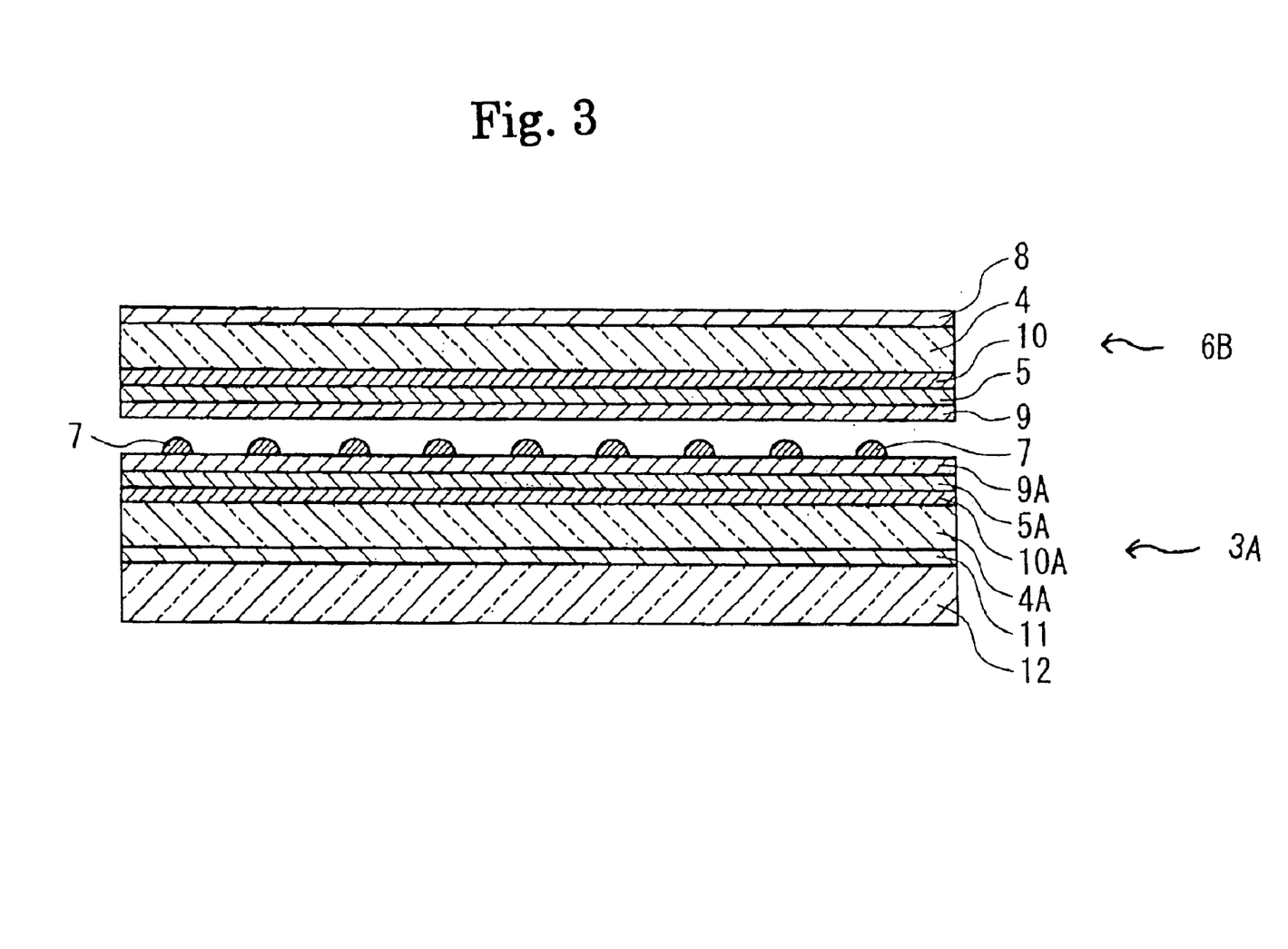
FIG. 3 shows a cross section of a touch panel of further another embodiment provided with a transparent electroconductive film of the present invention.

FIGS. 1 and 2 show cross sections of touch panels of embodiments, each of which is provided with a transparent electroconductive film of the present invention as an upper electrode. FIG. 3 shows a cross section of a touch panel of an embodiment provided with transparent electroconductive films of the present invention as an upper electrode and a lower electrode. In FIGS. 1 through 3, members which have the same functions as members shown in FIG. 4 are marked with the same numerals.

The transparent electroconductive film of the present invention comprises a polymer film 4 or 4A, a transparent electroconductive layer 5 or 5A deposited on the polymer film 4 or 4A, and a protection film 9 or 9A formed on the transparent electroconductive layer 5 or 5A.

In the transparent electroconductive film of the present invention, resin material for the polymer film which constitutes a substrate preferably is polyester, polyethylene terephtalate (PET), polybutylene terephtalate, polymethyl methacrylate (PMMA), acrylic resin, polycarbonate (PC), polystyrene, cellulose triacetate (TAC), polyvinyl alcohol, polyvinyl chloride, polyvinylidene chloride, polyethylene, ethylene-vinyl acetate copolymers, polyvinyl butyral, metal ion-crosslinked ethylene-methacrylic acid copolymers, polyurethane, cellophane, or the like, particularly is PET, PC, PMMA, or TAC because of its high strength, and more particularly is PET or TAC.

Though a thickness of such a polymer film changes according to application of the transparent electroconductive film, when the film is used as an upper electrode of a touch panel, the thickness thereof is preferably 13 μm to 0.5 mm. When the thickness of the polymer film is smaller than 13 μm, the polymer film may not have enough durability as an upper electrode. When the thickness exceeds 0.5 mm, the obtained touch panel becomes thick, and moreover, flexibility required as the upper electrode may not be obtained.

When the transparent electroconductive film is used as a lower electrode of a touch panel, the polymer film can be thicker than the aforementioned range, that is, the thickness of the polymer film can be 0.5 to 2 mm. As described bellow, however, the polymer film can also be the same thickness as that used as the upper electrode, by laminating it to a substrate such as a plastic board.

As for the transparent electroconductive layer 5 or 5A deposited on the polymer film 4 or 4A, transparent conductive oxide layer made of ITO (indium tin oxide), ATO (antimony tin oxide), ZnO, ZnO doped with Al, $SnO_2$, and so on can be preferably used. Particularly, an indium oxide-system (including a system doped with indium oxide), and of indium oxide and tin oxide (ITO), and of indium oxide and zinc oxide (IZO) are preferable. When the transparent electroconductive layer 5 is very thin, enough electrical conductivity may not be obtained. When the transparent electroconductive layer 5 is very thick, while the electrical conductivity does not increase any more, the film-forming cost rises, and in addition, the transparent electroconductive film becomes thicker. Therefore, the thickness of the transparent electroconductive layer 5 is preferably in a range from 1 to 500 nm, particularly 5 to 100 nm.

In the present invention, the protective layer 9 or 9A formed on the transparent electroconductive layer 5 or 5A are formed of material which does not spoil the electrical conductivity of the transparent electroconductive layer 5 or 5A and keeps the transparency required for the transparent electroconductive film.

The preferable example of the material for the protective layer includes a main component composed of at least one selected from the group consisting of oxide, nitride, carbide, carbon, and their composites (for example, oxidized nitride), more concretely, at least one selected from the group consisting of C (carbon), $CN_n(x \leq 1.4)$, $BN_y$, ($y \leq 1.1$), $B_zC$ ($z \leq 1 \times 10^{-6}-2$), SiC, and so on.

Material having low electrical conductivity or insulating material also may be used as the protective layer when the thickness of the protective layer is very thin and will not affect the electrical conductivity of the transparent electroconductive layer in its vertical direction. Examples of such materials include oxide, nitride, or oxidized nitride of at least one material selected from the group consisting of Si, Ti, Sn, Nb, In, Mg, Ta and Zn, more concretely, include $SiO_x(x=1.6-2.0)$, $TiO_x(x=1.6-2.0)$, $SnO_x(x=1.6-2.0)$, $NbO_x(x=1.0-2.5)$, $InO_x(x=1.0-1.5)$, $MgF_x(x=0.7-1.0)$, $TaO_x(x=1.0-2.5)$, and $ZnO_x(x=0.8-1.0)$. Such a material may be used singly or in combination of two or more. And also such a material may be used together with one or more than two of the aforementioned electroconductive materials for protective layer.

The thickness of the protective layer 9 or 9A is determined suitably according to the used material, the light transmittance required for the transparent electroconductive film, the required durability, and so on. When the protective layer 9 formed on the transparent electroconductive layer is very thin, the protective layer 9 can not protect the transparent electroconductive layer enough. On the other hand, as the protective layer 9 becomes thicker, its transparency decreases. Particularly, in case of using insulating material, this demerit is significant. And the transparent electroconductive film itself becomes thicker when the protective layer 9 becomes thicker. Therefore, the thickness of the protective layer 9 or 9A is preferably in a range from 0.5 to 100 nm, particularly in a range from 0.5 to 50 nm.

The light transmittance of the transparent electroconductive film usually, in case where the film is used for a PDP or a liquid crystal display which emits a light weakly, is preferably not smaller than 80%. Therefore, the thickness of the protective layer is determined in such a range that the light transmittance can be kept at the above rate. In case where the transparent electroconductive film is used for a cathode-ray tube having strong emission, since adjustment of its brightness is sometimes needed, the light transmittance of the film may be not greater than 80%.

As for the electrical conductivity, when the transparent electroconductive film is used as a touch panel, the surface resistivity at a side of the transparent electroconductive film where the protective layer 9 or 9A have been formed is preferably in a range from 300 to 2000 Ω/Sq., particularly 400 to 1000 Ω/Sq.

In the present invention, it is desired that the durability of the transparent electroconductive layer is improved by forming the protective layer 9 or 9A on the transparent electroconductive layer so as to keep the linearity value not greater than 1.5% after using it for a long period of time.

Therefore, in the present invention, the material, the thickness, and the constituent of the protective layer are designed suitably in such a manner that the aforementioned values of the surface resistivity, the linearity, and the light transmittance can be obtained.

Such a protective layer is preferably formed by a physical depositing method such as the vacuum evaporation method, the sputtering method, the ion plating method, and the laser ablation method, or by a chemical depositing method such as the CVD method, more preferably by the sputtering method, because the protective layer obtained by this method is excellent in denseness and adhesion to the transparent electroconductive layer, has few contamination during deposition of the layer, can be formed at high rate, can be formed continuously in the same equipment after deposition of the transparent electroconductive layer, and is excellent in the efficiency of the formation of the layer.

When a C or $CN_x$ protective layer is formed by sputtering method, the protective layer can be deposited into the desired composition by using high-purity carbon (graphite) as a target and by adjusting kinds and flow rates of surrounding gas and reactive gas.

Particularly preferable as the protective layer is $SiC_x(x=1\times10^{-6}-10)$, $SiC_xO_y(x=1\times10^{-6}-10, y=1\times10^6-5)$, $SiC_xN_z(x=1\times10^{-6}-10, z=1\times10^{-6}-5)$, and $SiC_xO_yN_z(x=1\times10^{-6}-10, y=1\times10^{-6}-5, z=1\times10^{-6}-5)$, which are deposited by using a SiC target and by adjusting kinds and flow rates of surrounding gas and reactive gas.

Preferable as the SiC target is obtained by sintering SiC powder with nonmetal-based sintering assistant such as coal tar pitch, phenolic resin, furan resin, epoxy resin, glucose, cane sugar, cellulose, and starch, having a density of not smaller than 2.9 g/cm³. In case of applying high voltage during the sputtering process in order to speed up the deposition of the layer, glow discharge changes into arc discharge, which causes damages to the transparent electroconductive layer deposited on the polymer film. When using such a SiC target having high density and uniformity, stable discharge at high voltage can be carried out during the deposition of the layer by sputtering, so that the deposition of the layer can be hastened.

The SiC target can be manufactured by mixing SiC powder with 3 to 30% by weight of the aforementioned nonmetal-based sintering assistant uniformly and then sintering the mixture at 1700 to 2200° C. The SiC target has a density of not smaller than 2.9 g/cm³ which is close to the theoretical density of the SiC target. Such a SiC target has no problem of generating gas during the deposition of the layer by sputtering, so that the layer can be deposited stably by sputtering.

The sputtering condition during the deposition of the protective layer is not limited, and sputtering can be conducted at a degree of vacuum from 0.05 to 1 Pa and a density of introduced electric power from 2 to 500 kW/m². Adjusting the flow rate of reactive gas and the length of time for the layer to be formed during the deposition process thereof realizes the protective layer composed of desired composition and having a desired thickness.

Though a transparent electroconductive layer can be formed according to conventional methods, generally, the transparent electroconductive layer is preferably formed by sputtering method just as the protective layer. In this case, the transparent electroconductive layer and the protective layer can be formed in one sputtering equipment continuously by only changing targets.

The protective layer can also be formed by coating the transparent electroconductive layer with the material therefor as it is or with a liquid substance including the material therefor and a solvent such as alcohol, ketone, toluene, hexane, etc.

As shown in FIGS. 1 through 3, the transparent electroconductive film of the present invention may have a hard-coating layer 8 to be formed on a surface of the polymer film 4 opposite to the surface where the transparent electroconductive layer 5 is deposited. Examples of the hard-coating layer 8 include acrylic-based layer, epoxy-based layer, urethane-based layer, silicon-based layer, and so on, and the thickness thereof is preferably from 1 to 50 μm.

The transparent electroconductive layer 5 may be formed on the polymer film 4 directly. Or, as shown in FIGS. 2, 3, a primary layer 10 or 10A may be interposed in between the polymer film 4 or 4A and the transparent electroconductive layer 5 or 5A. By forming such a primary layer 10 or 10A, adhesion of the transparent electroconductive layer 5 or 5A to the polymer film 4 or 4A is improved, and delamination of the transparent electroconductive layer 5 or 5A due to repeated deformation can be prevented effectively. That is, by forming the primary layer 10 or 10A on the polymer film 4 or 4A, gas generation from the polymer film 4 or 4A is prevented, so that the transparent electroconductive layer 5 or 5A can be deposited on the polymer film 4 or 4A with good adhesion. In addition, the primary layer 10 or 10A improves adhesion between the polymer film 4 or 4A and the transparent electroconductive layer 5 or 5A as an intermediate layer between these layer 4 or 4A and 5 or 5A. Furthermore, the primary layer 10 or 10A improves the strength of the transparent electroconductive film, thereby improving the resistance to scuffing.

In this case, examples of material for forming the primary layer 10 or 10A include, resin such as acryl-based resin, urethane-based resin and epoxy-based resin, and hydrolyzed organic silicon compound.

Before the primary layer 10 or 10A and the transparent electroconductive layer 5 or 5A are formed on the polymer film 4 or 4A, the surfaces of the polymer film 4 or 4A may be applied with plasma treatment, corona treatment, washing treatment with a solvent, etc., according to the conventional methods.

For improving optical properties of the transparent electroconductive film, the primary layer 10 of the transparent electroconductive layer 5 may be composed of two layers of a low refractive index layer and a high refractive index layer, or of multi layers formed by depositing a low refractive index layer and a high refractive index layer alternately. Or the surface of the hard-coating layer 8 may be exposed to anti-glare process or AR (anti-reflection) coating.

The touch panel shown in FIG. 1 includes the transparent electroconductive film of the present invention as an upper electrode 6A, which comprises a polymer film 4, a transparent electroconductive layer 5 deposited on a surface of the polymer film 4, a protective layer 9 formed on the transparent electroconductive layer 5, and a hard-coating layer 8 formed on the other surface of the polymer film 4. Damages and delamination of the transparent electroconductive layer 5 of the upper electrode 6A by the input of signal are prevented, so that the touch panel has good durability and reliability in electrical properties.

The touch panel shown in FIG. 2 includes a transparent electroconductive film of the present invention as an upper electrode 6B, which comprises a polymer film 4, a primary layer 10 deposited on a surface of the polymer film 4, a transparent electroconductive layer 5 deposited on the primary layer 10, a protective layer 9 formed on the transparent electroconductive layer 5, and a hard-coating layer 8 formed on the other surface of the polymer film 4. Compared to the touch panel in FIG. 1, the touch panel in FIG. 2 is more excellent in adhesion of the transparent electroconductive layer 5, thus having even better durability and reliability.

The touch panel shown in FIG. 3 includes the upper electrode 6B in FIG. 2 and further includes a transparent electroconductive film of the present invention as a lower electrode. The lower electrode 3A of the touch panel comprises the transparent electroconductive film of the present invention having a polymer film 4A, a transparent electroconductive layer 5A deposited on the polymer film 4A via a primary layer 10A, and a protective layer 9A formed on the transparent electroconductive layer 5A, micro-dot spacers 7 provided on the protective layer 9A, and a plastic board 12 made of an acrylic resin, a polycarbonate resin, and so on, laminated on the other surface of the polymer layer 4A via a pressure-sensitive adhesive 11. In this touch panel, the transparent electroconductive layers 5 and 5A of the upper electrode 6B and the lower electrode 3A are protected by the protective layers 9 and 9A, respectively, and are improved in adhesion by the primary layers 10 and 10A, respectively, so that the touch panel has remarkably high durability and reliability.

The transparent electroconductive film of the present invention also can be used effectively for application of transparent switching devices or other various kinds of optical transparent electroconductive films, in addition to the application of the upper electrode or lower electrode of a touch panel.

EXAMPLES

Hereinafter, the mode of carrying out the present invention will be described in more detail referring to some Examples and Comparative examples. It should be noted that the present invention is not limitative to them.

Example 1

A PET film having a thickness of 188 μm was employed as a substrate. A hard-coating layer with a thickness of 5 μm was, firstly, formed on one surface of the PET film by wet coating an acryl-based photo-curing hard coating material (Z7501 manufactured by JSR corporation, in which the solid content was 35% by weight and the solvent thereof was methyl ethyl ketone.).

The film was set in a magnetron DC sputtering device with both an ITO target including 10% by weight of tin oxide and having a purity of 99.99% as targets of a transparent electroconductive layer, and a graphite target having a purity of 99%.

The sputtering device was evacuated with a turbo-molecular pump to lower its internal pressure to $1\times10^{-4}$ Pa, and then Ar gas and $O_2$ gas were introduced into the sputtering device at flow rate of 196 sccm and 4 sccm, respectively, as a mixed gas to hold the internal pressure at 0.5 Pa. After that, the ITO target was applied with voltage, so that an ITO thin layer having a thickness of about 20 nm was deposited on a surface of the PET film opposite to the other surface where the hard-coating layer was formed. Then the gas in the sputtering device was replaced by Ar gas, and the internal pressure was adjusted to 0.5 Pa. After that, the graphite target was applied with voltage, so that a carbon thin layer having a thickness of about 3 nm was deposited onto the ITO thin layer as a protective layer.

Introduced DC power of the sputtering device was set at 4 kW.

The resulted transparent electroconductive film was measured in its surface resistivity at a side where the protective layer was deposited by using a surface resistivity measuring device (Roresta AP manufactured by Mitsubishi Chemical corporation), and was tested in abrasion resistance in the sliding wear test conducted by scratching the surface with a pen in the following manner. The results are shown in Table 1.

<Sliding Wear Test Conducted By Scratching The Surface Of The Film With a Pen>

The side of the transparent electroconductive film covered with a transparent electroconductive layer (a protective layer) faced a surface of an ITO grass board where micro-dot spacers were provided, and these were laminated to each other. And then, the other surface of the transparent electroconductive film covered with a hard-coating layer was scratched back and forth with a pen made of polyacetal resin (its tip part has a curvature radius of 0.8 R) under a load of 250 gf. After that, the film was determined in a linearity value. If the linearity was not larger than 1.5%, the film was regarded to be "Good", however, if the linearity was larger than 1.5%, the film was regarded to be "Inferior". The appearances of the films were also observed.

Example 2

A transparent electroconductive film was produced in the same manner as Example 1 except that a SiC target was used instead of the graphite target and a SiC thin layer having a thickness of about 3 nm was deposited as a protective layer.

The resulted transparent electroconductive film was measured in the surface resistivity and the abrasion resistance in the same manner as Example 1. The results are shown in Table 1.

The used SiC target in Example 2 was obtained by mixing SiC powder with 20% by weight of phenolic resin as a sintering assistant uniformly and sintering at 2100° C. The SiC target had a density of 2.92 g/cm$^3$.

Example 3

A transparent electroconductive film was prepared in the same manner as Example 2 except that after the ITO transparent electroconductive layer was deposited, mixed gas of 170 sccm Ar gas and 30 sccm $O_2$ gas was introduced into the sputtering device to hold the internal pressure at 0.5 Pa, and then the SiC target was applied with voltage, so that a $SiC_xO_y$ (x=0.05, y=1.9) thin layer having a thickness of about 3 nm was deposited as a protective layer.

The resulted transparent electroconductive film was measured in the surface resistivity and the abrasion resistance in the same manner as Example 1. The results are shown in Table 1.

Example 4

A transparent electroconductive film was prepared in the same manner as Example 1 except that after the ITO transparent electroconductive layer was deposited, 200 sccm $N_2$, instead of the mixed gas, gas was introduced into the sputtering device to hold the internal pressure at 0.5 Pa, and then the graphite target was applied with voltage, so that a $CN_x$ (x=0.8) thin film having a thickness of about 3 nm was deposited as the protective layer.

The resulted transparent electroconductive film was measured in the surface resistivity and the abrasion resistance in the same manner as Example 1. The results are shown in Table 1.

Comparative Example 1

A transparent electroconductive film was prepared in the same manner as Example 1 except that a protective layer was not formed.

The resulted transparent electroconductive film was measured in the surface resistivity and the abrasion resistance in the same manner as Example 1. The results are shown in Table 1.

TABLE 1

| | Material of protection layer | Surface resistivity (Ω/Sq.) | Result of abration test |
|---|---|---|---|
| Example 1 | C | about 450 | Linearity value was not larger than 1.5% after scratching the film back and forth with a pen for one hundred thousand times. Appearance of the film was not changed. |
| Example 2 | SiC | about 450 | Linearity value was not larger than 1.5% after scratching the film back and forth with a pen for one hundred thousand times. Appearance of the film was not changed. |
| Example 3 | $SiC_xO_y$ | about 450 | Linearity value was not larger than 1.5% after scratching the film back and forth with a pen for one hundred thousand times. Appearance of the film was not changed. |
| Example 4 | $CN_x$ | about 450 | Linearity value was not larger than 1.5% after scratching the film back and forth with a pen for one hundred thousand times. Appearance of the film was not changed. |
| Comparative Example 1 | — | about 450 | Linearity value exceeded 1.5% after scratching the film back and forth with a pen for twenty thousand times. The scratched part of the film became clouded. |

As cleared from Table 1, according to the present invention, a transparent electroconductive film having no problem of degradation of the electrical properties and having good durability is provided.

As described in detail, according to the present invention, a transparent electroconductive film in which damages and delamination of a transparent electroconductive layer are prevented effectively by a protective layer formed on the transparent electroconductive layer, and a touch panel including the transparent electroconductive film, which has no problem of degradation of electrical properties caused by damages and delamination of the transparent electroconductive layer, thus having good durability and reliability, are provided.

What is claimed is:

1. A transparent electroconductive film comprising a polymer film, a transparent electroconductive layer deposited on the polymer film, and a protective layer formed on the transparent electroconductive layer, said protective layer mainly consisting of at least one material selected from the group consisting of C, $CN_x$, $BN_x$, $B_xC$, and $SiC_x$.

2. A transparent electroconductive film as claimed in claim 1, wherein the transparent electroconductive layer is made of oxide, nitride or oxidized nitride of at least one material selected from the group consisting of Si, Ti, Sn, Nb, In, Mg, Ta and Zn.

3. A transparent electroconductive film as claimed in claim 1, wherein the protective layer has a thickness of 0.5 to 100 nm.

4. A transparent electroconductive film as claimed in claim 1, wherein the protective layer is formed by a physical vapor-depositing process selected from vacuum evaporation process, sputtering process, ion plating process, and laser abrasion process, or by a chemical vapor-depositing process.

5. A transparent electroconductive film as claimed in claim 1, wherein the protective layer is formed by coating the transparent electroconductive layer with a material of the protective layer as it is or with a liquid substance including the material of the protective layer and a solvent.

6. A transparent electroconductive film comprising a polymer film, a transparent electroconductive layer deposited on the polymer film, and a protective layer formed on the transparent electroconductive layer and being composed of a thin film made of $SiC_x$, $SiC_xO_y$, $SiC_xN_z$, or $SiC_xO_yN_z$ deposited by sputtering of a SiC target.

7. A transparent electroconductive film as claimed in claim 6, wherein the SiC target has a density of not smaller than 2.9 g/cm$^3$.

8. A transparent electroconductive film as claimed in claim 6, wherein the SiC target is prepared by sintering a mixture of SiC powder and a nonmetal-based sintering assistant.

9. A transparent electroconductive film as claimed in claim 1, wherein a surface of the transparent electroconductive film where the protective layer is formed has 300 to 2000 Ω/Sq. surface resistivity and not larger than 1.5% linearity value.

10. A transparent electroconductive film as claimed in claim 1, wherein the transparent electroconductive layer is one of indium oxide, a composite of indium oxide and tin oxide, and a composite of indium oxide and zinc oxide.

11. A touch panel provided with the transparent electroconductive film as claimed in claim 1.

12. A touch panel provided with the transparent electroconductive film as claimed in claim 2.

* * * * *